United States Patent
Tsuneki

(10) Patent No.: US 7,489,607 B2
(45) Date of Patent: Feb. 10, 2009

(54) METHOD OF INSPECTING A PHASE-CHANGE TYPE OPTICAL RECORDING MEDIUM

(75) Inventor: Keizo Tsuneki, Kanagwa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 11/311,237

(22) Filed: Dec. 20, 2005

(65) Prior Publication Data

US 2006/0158986 A1 Jul. 20, 2006

(30) Foreign Application Priority Data

Jan. 19, 2005 (JP) .............................. 2005-011883

(51) Int. Cl.
*G11B 27/36* (2006.01)

(52) U.S. Cl. ................................. 369/53.31; 369/47.51

(58) Field of Classification Search ............. 369/53.31, 369/53.36, 47.51, 47.53, 59.17, 124.15
See application file for complete search history.

(56) References Cited

U.S. PATENT DOCUMENTS

| | | | | |
|---|---|---|---|---|
| 6,022,605 | A * | 2/2000 | Kaneko et al. | 369/283 |
| 6,611,481 | B1 * | 8/2003 | Koishi et al. | 369/47.53 |
| 7,065,017 | B2 * | 6/2006 | Nishida | 369/53.34 |
| 7,088,656 | B2 * | 8/2006 | Narumi et al. | 369/53.27 |
| 7,154,827 | B2 * | 12/2006 | Tokita et al. | 369/53.34 |
| 2004/0052165 | A1 * | 3/2004 | Kuribayashi et al. | 369/13.27 |
| 2006/0007828 | A1 * | 1/2006 | Kadowaki et al. | 369/53.12 |

FOREIGN PATENT DOCUMENTS

| JP | 04-364225 | 12/1992 |
|---|---|---|
| JP | 2002-251841 | 9/2002 |

* cited by examiner

*Primary Examiner*—Thang V Tran
(74) *Attorney, Agent, or Firm*—Oblon, Spivak, McClelland, Maier & Neustadt, P.C.

(57) ABSTRACT

The invention aims at enabling degradation of quality of a regenerative signal due to repetitive overwrite in a high temperature environment to be evaluated based on an inspection under a room temperature environment for a repetitively rewritable phase-change type optical recording medium. Overwrite is repetitively performed to the same track with a laser power which is a given value larger than a laser power with which jitter in a regenerative signal becomes minimum at a room temperature for a phase-change type optical recording medium in which a recording layer made of a material in which a phase change between a crystalline state and an amorphous state is caused due to a difference in applied laser power is provided. A jitter value of the regenerative signal after the overwrite is repetitively performed the given number of times is measured and it is judged whether or not the measured jitter value is equal to or smaller than a reference value, thereby evaluating degradation of quality of the regenerative signal.

6 Claims, 5 Drawing Sheets

METHOD OF INSPECTING A PHASE-CHANGE TYPE OPTICAL RECORDING MEDIUM

CROSS REFERENCES TO RELATED APPLICATIONS

The present invention contains subject matter related to Japanese Patent Application JP 2005-011883 filed in the Japanese Patent Office on Jan. 19, 2005, the entire contents of which being incorporated herein by reference.

BACKGROUND OF THE INVENTION

The present invention relates to a method of inspecting a phase-change type optical recording medium, and more particularly to an inspection method of evaluating degradation of quality of a regenerative signal regenerated from a phase-change type optical recording medium due to repetition of overwrite in a high temperature environment.

Heretofore, in a phase-change type optical recording medium (hereinafter referred to as "an optical disc"), a recording layer made of a material in which a phase change between a crystalline state and an amorphous state is caused due to a difference in applied laser power is formed on a transparent substrate. During a recording operation, a laser beam is applied to the recording layer to partially melt the recording layer, and the partially molten recording layer is rapidly cooled and solidified, thereby forming an amorphous recording mark in the recording layer. On the other hand, during an erase operation, the laser beam is applied to the amorphous recording mark to heat the amorphous recording mark at a temperature which is equal to or lower than a melting point of the recording layer, but equal to or higher than a crystallization temperature of the recording layer. As a result, the amorphous recording mark is crystallized to return the phase state of the amorphous recording mark back to an original unrecorded phase state. The repetitive rewrite, i.e., the so-called repetitive overwrite can be performed for the phase-change type optical disc by repetitively executing these kinds of processing.

However, when the overwrite is repetitively performed for the optical disc, a thickness of the recording layer is changed due to mass transfer in the recording layer and materials in a dielectric layer contacting the recording layer diffuse into the recording layer. As a result, there is encountered such a problem that the jitter characteristics become worse, and the signal amplitude is reduced, and thus the signal error rate increases.

In order to solve this problem, a technique is disclosed in which a metallic layer is provided right above or right under a recording layer in order to cause the heat generated within the recording layer to diffuse into the metallic layer, whereby the thermal damages incurred on a recording layer during an overwrite operation is reduced to enhance the durability of the recording layer against the repetition of the overwrite (refer to Japanese Patent Laid-Open No. Hei 6-36352).

SUMMARY OF THE INVENTION

Now, it has been found out that the quality degradation of the regenerative signal due to the repetitive overwrite becomes remarkable in the temperature environment rather than in a room temperature environment. Consequently, for the phase-change type optical disc, it is necessary to guarantee the repetitive overwrite characteristics in the high temperature environment on the assumption that a recording/reproducing drive is used in the high temperature environment. However, there is encountered such a problem that an inspecting apparatus for the optical disc is precision mechanical equipment, and thus the measurement accuracy of the inspecting apparatus in the high temperature environment is not guaranteed. For this reason, as things stand, the highly accurate inspection for the quality degradation due to the repetitive overwrite has not been performed in the high temperature environment.

The present invention has been made in the light of the foregoing, and it is desirable to provide a method of inspecting a phase-change type optical recording medium which enables quality degradation of a repetitive signal due to repetitive overwrite in a high temperature environment to be accurately evaluated based on an inspection under a room temperature environment for a repetitively rewritable phase-change type optical recording medium.

According to an embodiment of the present invention, there is provided a method of inspecting a phase-change type optical recording medium, including the steps of: performing repetitively overwrite to the same track with a laser power which is a given value higher than a laser power with which a jitter of a regenerative signal becomes minimum at a room temperature for a phase-change type optical recording medium in which a recording layer made of a material in which a phase change between a crystalline state and an amorphous state is caused due to a difference in applied laser power is provided; measuring a jitter value of the regenerative signal after the overwrite is performed the given number of times; and judging whether or not the measured jitter value is equal to or smaller than a reference value.

Preferably, for example, the overwrite is performed with the laser power which is a value of about 10% to about 15% larger than the laser power with which the jitter becomes minimum.

According to an embodiment of the present invention, the overwrite is repetitively performed with the laser power which is slightly larger than the optimal power at the room temperature, and the jitter value when the overwrite is performed is measured. As a result, it is possible to accurately and simply measure the degradation of the characteristics of the phase-change type optical recording medium due to the repetitive overwrite at the high temperature.

According to the present invention, the jitter value of the regenerative signal is measured whenever the overwrite is repetitively performed at the room temperature. As a result, it is possible to estimate the degradation of the quality of the regenerative signal when the overwrite is repetitively performed in the high temperature environment. Consequently, there is offered such an effect that the durability of the phase-change type optical recording medium can be accurately measured without imposing a burden on an optical disc inspecting apparatus, and whether or not the specification is fulfilled can be accurately and simply judged.

DETAILED DESCRIPTION OF THE PREFERRED EMBODIMENTS

Hereinafter, a preferred embodiment of a method of inspecting a phase-change type optical recording medium according to the present invention will be described in detail with reference to FIGS. 1 to 5.

Figure 1:
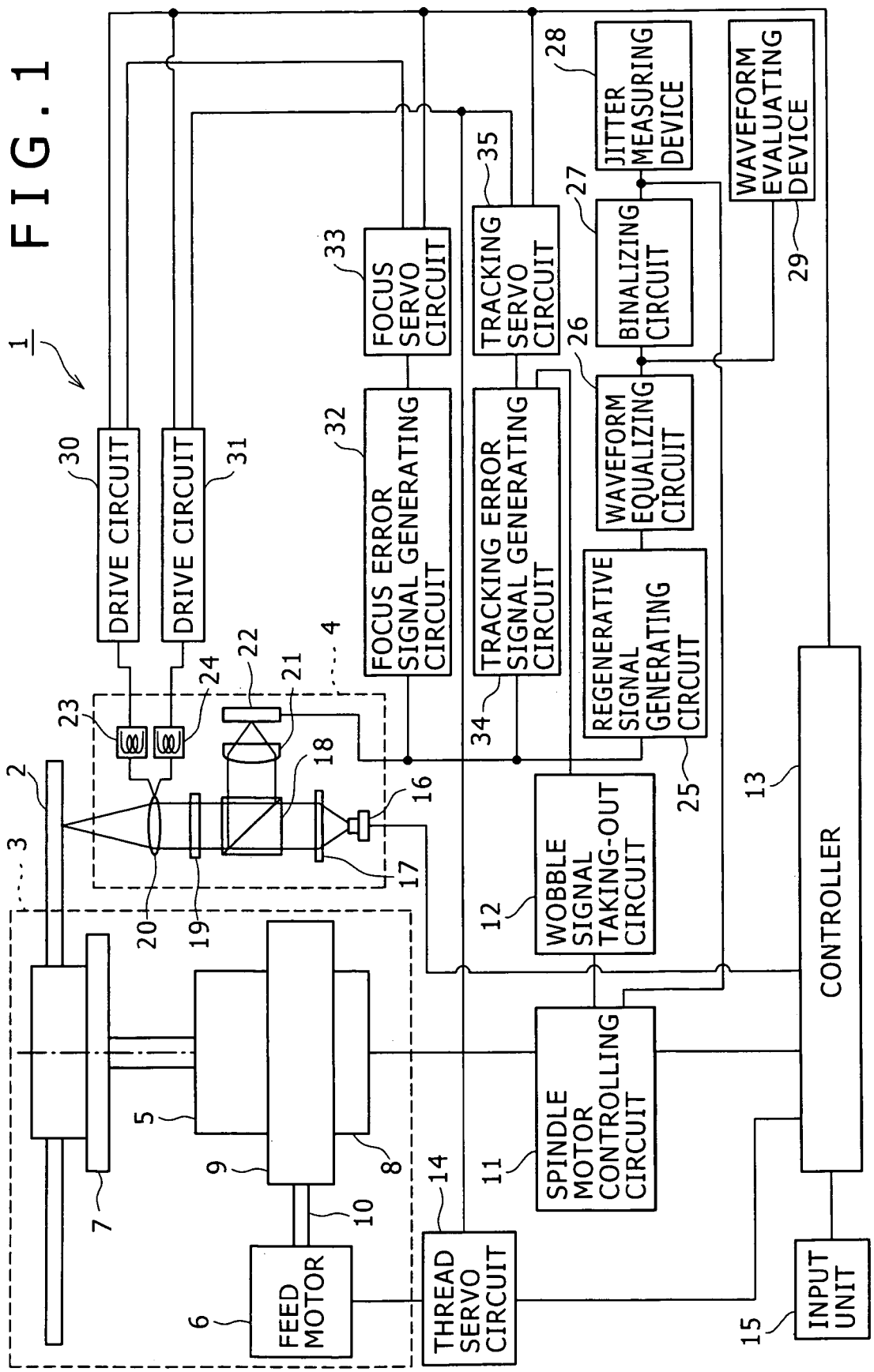
FIG. 1 is a block diagram showing a configuration of an optical disc inspecting apparatus used in a method of inspecting an optical recording medium according to an embodiment of the present invention.

Firstly, FIG. 1 shows an optical disc inspecting apparatus used in a method of inspecting a phase-change type optical recording medium (hereinafter referred to as "an optical disc") according to an embodiment of the present invention. It should be noted that a configuration of an optical disc inspecting apparatus 1 shown in FIG. 1 is merely an example, and thus the present invention is not limited to this configuration.

An optical disc inspecting apparatus 1 includes a drive 3 and an optical pickup device 4. The drive 3 serves to rotation-drive a rewritable phase-change type optical disc 2, and the optical pickup device 4 serves to apply a laser beam to the optical disc 2 and to receive reflected light from the optical disc 2 based on the application of the laser beam.

The drive 3 includes a spindle motor 5 for and a feed motor 6. The spindle motor 5 serves to rotation-drive the optical disc 2, and the feed motor 6 serves to radially move the optical disc 2. A turn table 7 is fixed to a rotation axis of the spindle motor 5, and the optical disc 2 is adapted to be detachably installed on the turn table 7. In addition, an encoder 8 is incorporated within the spindle motor 5. The encoder 8 serves to detect the rotation of the spindle motor 5, i.e., the rotation of the turn table 7 (the optical disc 2) to output a rotation detection signal representing a state of the rotation.

In addition, the rotation of the spindle motor 5 is controlled by a spindle motor controlling circuit 11. The spindle motor controlling circuit 11 controls a rotating speed of the spindle motor 5 so that a light spot on the optical disc 2 moves at a fixed linear velocity with respect to the optical disc 2 by using a wobble signal supplied from a wobble signal taking-out circuit 12, and a digital signal (a regenerative signal from the optical disc 2) supplied from a binarizing circuit 27 which will be described later.

A velocity control signal is also inputted from the controller 13 to the spindle motor controlling circuit 11, and the linear velocity of the light spot on the optical disc 2 is switched over to another one (e.g., a double velocity, a fourfold velocity, or the like with respect to the reference velocity) by using the velocity control signal. In this case, a frequency of the clock signal has to be multiplied, and the multiplied clock signal and the wobble signal have to be synchronized with each other.

The feed motor 6 is connected to a supporting member 9 which fixedly supports the spindle motor 5 through a screw rod 10 and for which only the radial movement of the optical disc 2 is allowed. One end of the screw rod 10 is connected to the rotation axis of the feed motor 6 so as to be rotated integrally with the feed motor 6, and the other end of the screw end 10 is screwed into a nut (not shown) fixed to the supporting member 9. Thus, when the feed motor 6 rotates, the spindle motor 5, the turn table 7 and the supporting member 9 are displaced in a radial direction of the optical disc 2 by a screw mechanism including the screw rod 10 and the nut.

Also, an encoder (not shown) for detecting the rotation of the feed motor 6 to output the same rotation detecting signal as that in the above-mentioned encoder 8 is incorporated in the feed motor 6 as well. The rotation detection signal from this encoder is supplied to a thread servo circuit 14. The thread servo circuit 14 controls the rotation of the feed motor 6 by using a tracking servo signal in addition to this rotation detection signal to control the displacement of the spindle motor 5, the turn table 7 and the supporting member 9 in the radial direction of the optical disc 2. More specifically, the thread servo circuit 14 receives as its input a signal representing a radial position of the light spot, on the optical disc 2, specified through an input circuit 15 from the controller 13. Then, the thread servo circuit 14 moves the light spot to the specified radial position by using the rotation detection signal from the encoder 8. In addition, the thread servo circuit 14 performs the control so that the light spot follows the tracks on the optical disc 2 by using the tracking servo signal.

On the other hand, the optical pickup device 4 includes a laser light source 16, a collimator lens 17, a polarization beam splitter 18, a ¼ wavelength plate 19, an objective 20, a cylindrical lens 21, and a photo-detector 22. In the optical pickup device 4, the laser beam emitted from the laser light source 16 is collected on the optical disc 2 through the collimator lens 17, the polarization beam splitter 18, the ¼ wavelength plate 19, and the objective 20 to form a light spot on the optical disc 2. In addition, the reflected light from the light spot formed on the optical disc 2 is introduced into the photo-detector 22 to be received thereat through the objective 20, the ¼ wavelength plate 19, the polarization beam splitter 18, and the cylindrical lens 21. The photo-detector 22 is constituted by a four partition light receiving element including four light receiving elements which have the same square shape and which are obtained through the partition using partition lines. The four light receiving elements output detection signals A, B, C and D proportional to quantities of received light in the form of received light signals, respectively.

In addition, the optical pickup device 4 also includes a focus actuator 23 and a tracking actuator 24. The focus actuator 23 drives the objective 20 in a direction of an optical axis of the laser beam (in a direction perpendicular to the disc surface of the optical disc 2). The tracking actuator 24 drives the objective 20 in a radial direction of the optical disc 2.

The optical disc inspecting apparatus 1 includes an amplifying circuit (not shown) connected to the photo-detector 22 for amplifying the detection signals A, B, C and D from the photo-detector 22, respectively. A regenerative signal generating circuit 25, a focus error signal generating circuit 32 and a tracking error signal generating circuit 34 are connected to the amplifying circuit.

The regenerative signal generating circuit 25 generates a generative signal (a SUM signal as a sum signal (A+B+C+D) of the detection signals A to D from the photo-detector 22) based on a signal from the amplifying circuit. This regenerative signal is connected with its amplitude depending on the frequency by a waveform equalizing circuit 26 constituted by an equalizing circuit and outputted to the binalizing circuit 27. The regenerative signal so outputted is converted into a binary signal, i.e., a digital signal by the binalizing circuit 27 and supplied to a jitter measuring device 28. The jitter of the regenerative signal is measured and utilized as an evaluation factor for the quality degradation of the regenerative signal by the jitter measuring device 28. In addition, an output signal from the waveform equalizing circuit 26 is also supplied to a waveform evaluating device 29 constituted by a digital oscilloscope. Then, the waveform evaluating device 29 performs the evaluation for the waveform of the regenerative signal on a symmetric property of the regenerative signal, an amplitude ratio for each recording mark length, and the like.

The jitter measuring device 28 and the waveform evaluating device 29 supply the evaluation results about the regenerative signal to the controller 13 under the control made by the controller 13 which is constituted by a computer and which functions as control means. Hence, the controller 13 inspects the optical disc 2 by using these evaluation results. In addition, the digital signal from the binarizing circuit 27 is also outputted to the spindle motor controlling circuit 11 in order to control the spindle motor 5 in the manner as described above.

A focus error signal generating circuit 32 generates a focus error signal based on an arithmetic operation using the detection signals A to D from the photo-detector through the amplifying circuit (more specifically, an arithmetic operation of $\{(A+C)-(B+D)\}$ made by utilizing an astigmatism method). Then, the focus error signal generating circuit 32 outputs the focus error signal to a focus servo circuit 33. The focus servo circuit 33 generates a focus servo signal based on the focus error signal outputted thereto, and supplies the focus servo signal to a drive circuit 30. The drive circuit 30 controls the drive of a focus actuator 23 in correspondence to the focus servo signal to displace the objective 20 in the direction of the optical axis. The drive circuit 30 performs the focus servo control in such a manner.

In addition, a tracking error signal generating circuit 34 generates a tracking error signal based on the arithmetic operation using the detection signals A to D sent from the photo-detector 22 through the amplifying circuit (more specifically, the arithmetic operation of $\{(A+B)-(C+D)\}$. Then, the tracking error signal generating circuit 34 outputs the tracking error signal so generated to the tracking servo circuit 35. The tracking servo circuit 35 generates a tracking servo signal based on the tracking error signal, and supplies the tracking servo signal so generated to a drive circuit 31. The drive circuit 31 controls the drive of the tracking actuator 24 in correspondence to the tracking servo signal to displace the objective 20 in the radial direction of the optical disc 2. The drive circuit 31 performs the tracking servo control in such a manner.

Then, the tracking error signal generated in the tracking error signal generating circuit 34 is also supplied to the wobble signal taking-out circuit 12 constituted by a bandpass filter. The wobble signal taking-out circuit 12 takes out a wobble signal from the tracking error signal and supplies the wobble signal so taken out to the spindle motor controlling circuit 11. The wobble signal so supplied is used to rotate the optical disc 2 at a given linear velocity in the spindle motor controlling circuit 11. In addition, the tracking servo signal generated in the tracking servo circuit 35 is also supplied to the thread servo circuit 14. The thread servo circuit 14 extracts a D.C. component from the tracking servo signal supplied thereto, and the D.C. component so extracted is used for the control for the feed motor 6. The tracking servo signal is utilized for making the light spot follow the tracks in the thread servo circuit 14.

The input circuit 15 such as a keyboard is also connected to the controller 13. An instruction relating to an operation of the optical disc inspecting apparatus 1 is inputted through the keyboard by a user. For example, an instruction to specify the magnitude of the linear velocity (to switch the linear velocity) of the light spot on the optical disc 2 is issued through the keyboard. In addition, the controller 13 outputs a velocity control signal representing the magnitude of the linear velocity of the light spot on the optical disc 2 to the spindle motor controlling circuit 11 in accordance with the instruction issued through the input unit 15, and controls the switching of the linear velocity (the rotating speed of the spindle motor 5). Moreover, the controller 13 also controls the light emission for the laser light source 16. For example, the controller 13 switches the power of the laser beam to be applied to the optical disc 2 over to another one in accordance with the instruction issued through the input unit 15.

A recording layer made of a material in which a phase change between a crystalline state and an amorphous state is caused due to a difference in laser power applied thereto is provided on a transparent substrate in the phase-change type optical disc 2 as an object of the measurement. After the laser beam with a strong power is applied from the laser light source 16 to the recording layer for a short period of time to rapidly heat the recording layer at a temperature equal to or higher than a melting point to melt partially the recording layer, the partially molten recording layer is rapidly cooled to be amorphized, thereby forming a recording mark in the recording layer. In addition, after the laser beam with a relative weak power is applied to the recording mark to make the temperature of the recording mark rise up to a range of crystallizable temperatures each being lower than the melting point, the recording mark is slowly cooled to be crystallized, thereby performing the erase.

Figure 2:
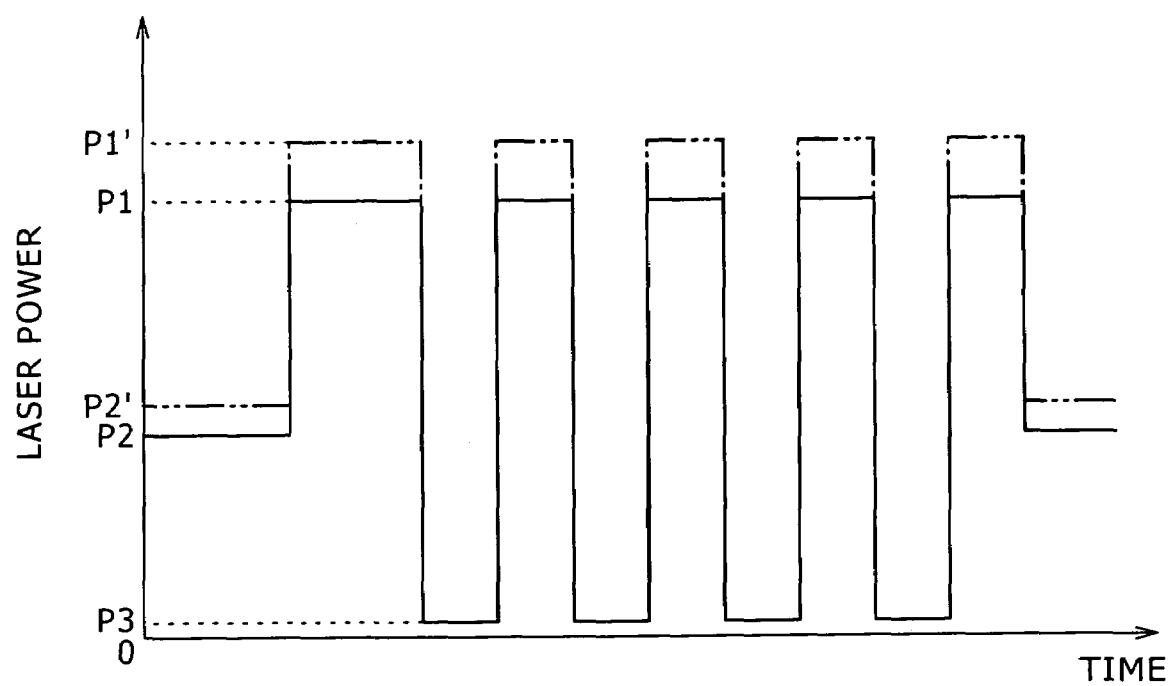
FIG. 2 is a diagram showing an example of a waveform of a modulated laser power in the method of inspecting an optical recording medium according to the embodiment of the present invention.

That is, during the recording operation, the spot-like laser beam which is modulated so as to have a laser power waveform as shown in FIG. 2 for example is applied to the recording layer in correspondence to an information signal. In FIG. 2, an axis of abscissa represents time, and an axis of ordinate represents a laser power. A portion of the optical disc 2 which is irradiated with the laser beam with a recording power (P1), i.e., with an amorphization level becomes the amorphous state irrespective of the phase state before irradiation of the laser beam. On the other hand, a portion of the optical disc 2 which is irradiated with the laser beam with an erase power (P2), i.e., with a crystallization level becomes the crystalline state irrespective of the phase state before irradiation of the laser beam. The recording mark is formed or erased in or from the recording layer through such an overwrite operation. Also, the recording layer of the optical disc 2 is irradiated with the laser beam with a weak level (P3) and a change in quality of light between the crystalline state and the amorphous state is detected, thereby performing the reproduction of the information. The recording power (P1) and the erase power (P2) are set to laser powers (optimal powers) at which the regenerated jitters become minimum, respectively.

In such an optical disc 2, when the overwrite is repetitively performed over and over to the same track of the recording layer, owing to the accumulation of the thermal damages, the thickness of the thin film from which the recording layer is formed changes, the error occurs since the initial characteristics of the recording layer cannot be held. As a result, the regenerative signal faithful to the recording signal cannot come to be obtained. The degradation of the characteristics of the optical disc due to the repetitive overwrite remarkably appears in the high temperature environment rather than in the room temperature environment. Moreover, the degree of degradation of the characteristics also differs depending on the optical discs.

The results of measuring the degradation of the characteristics of a DVD-ReWritable (DVD-RW) medium, standardized in the DVD Forum, as an example of the overwritable phase-change type optical disc 2 by using the optical disc inspecting apparatus 1 will hereinafter be described with reference to FIGS. 3A and 3B.

Figure 3A:
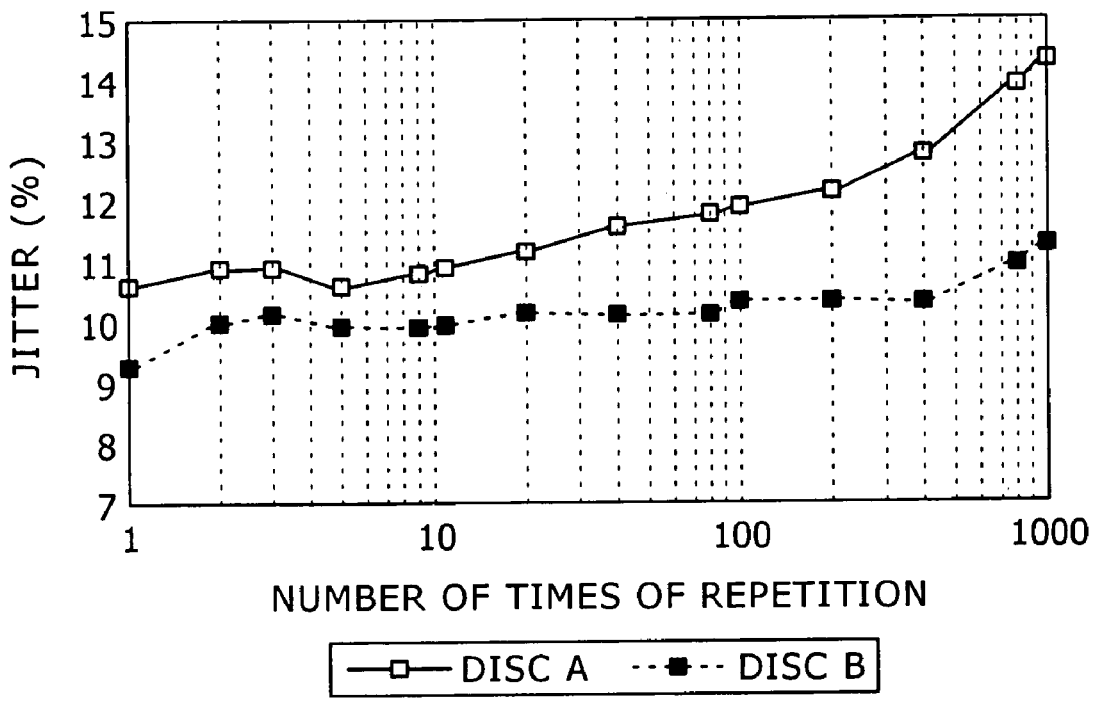
FIGS. 3A and 3B are respectively a graphical representation showing an example of measurement results of jitter values when overwrite is repetitively performed for two optical recording medium at a high temperature, and a graphical representation showing an example of measurement results of jitter values when the overwrite is repetitively performed for the two optical recording medium at a room temperature.

FIG. 3A shows an example of the results of measuring jitter values when the overwrite was repetitively performed for two DVD-RW discs A and B at a high temperature. FIG. 3B shows an example of measuring jitter values when the overwrite was repetitively performed for the two DVD-RW discs A and B at a room temperature. In the measurements in these examples, the high temperature was set to about 60° C. and the room temperature was set to about 20° C., and the overwrite was performed 1,000 times at the optimal power. In addition, while the rotating speed (linear velocity) of the standard DVD is 3.5 m/s, the measurements were performed at the rotating speed of 7.0 m/s which was twice as high as that of 3.5 m/s. While in these examples, the measurements were performed at the rotating speed which is twice as high as the normal rotating speed, even when the measurements are performed at the normal rotating speed, nearly the same results are obtained.

Figure 3B:
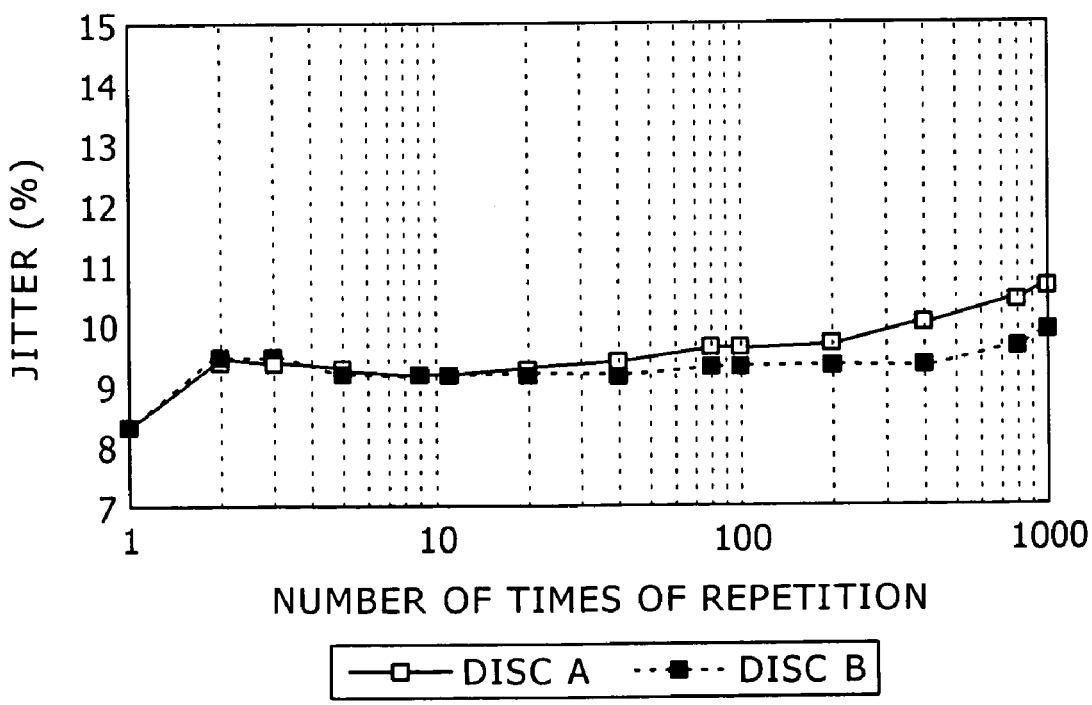

As can be seen from FIGS. 3A and 3B, at the room temperature, the jitter degradation is suppressed to the small degree in both the two optical discs A and B. However, at the high temperature, a difference in jitter value between the two optical discs A and B becomes remarkable as the number of times of the overwrite increases, and thus the jitter in the optical disc A is largely degraded. That is, when the measurement is performed in the high temperature environment, the difference in quality between the two optical discs can be readily distinguished. However, it is difficult to estimate the degradation of the characteristics in the normal inspection in the room temperature environment. At that, the same measurement results were obtained even in the case of a DVD+RW medium standardized in the DVD+RW alliance.

Then, in this application, in order to evaluate the degradation of the characteristics of the optical disc due to the repetitive overwrite at the high temperature based on the inspection at the room temperature, in the room temperature environment, the overwrite was repetitively performed with the recording power which was a given value larger than the recording power (optimal power) allowing the minimum jitter. Then, the jitter value of the regenerative signal after the overwrite was performed the given number of times, e.g., 1,000 times was measured. That is, as shown in FIG. 2, the overwrite was repetitively performed with laser powers P1' and P2' which were given values larger than the optimal amorphization level (P1) and the optimal crystallization level (P2), respectively. At this time, the ratio of the erase power level (P2') to the recording power level (P1') of the laser power is the same as that of the erase power level (P2) to the recording power level (P1), and thus is held constant. From the above-mentioned measurements, the following results were obtained.

Figure 4:
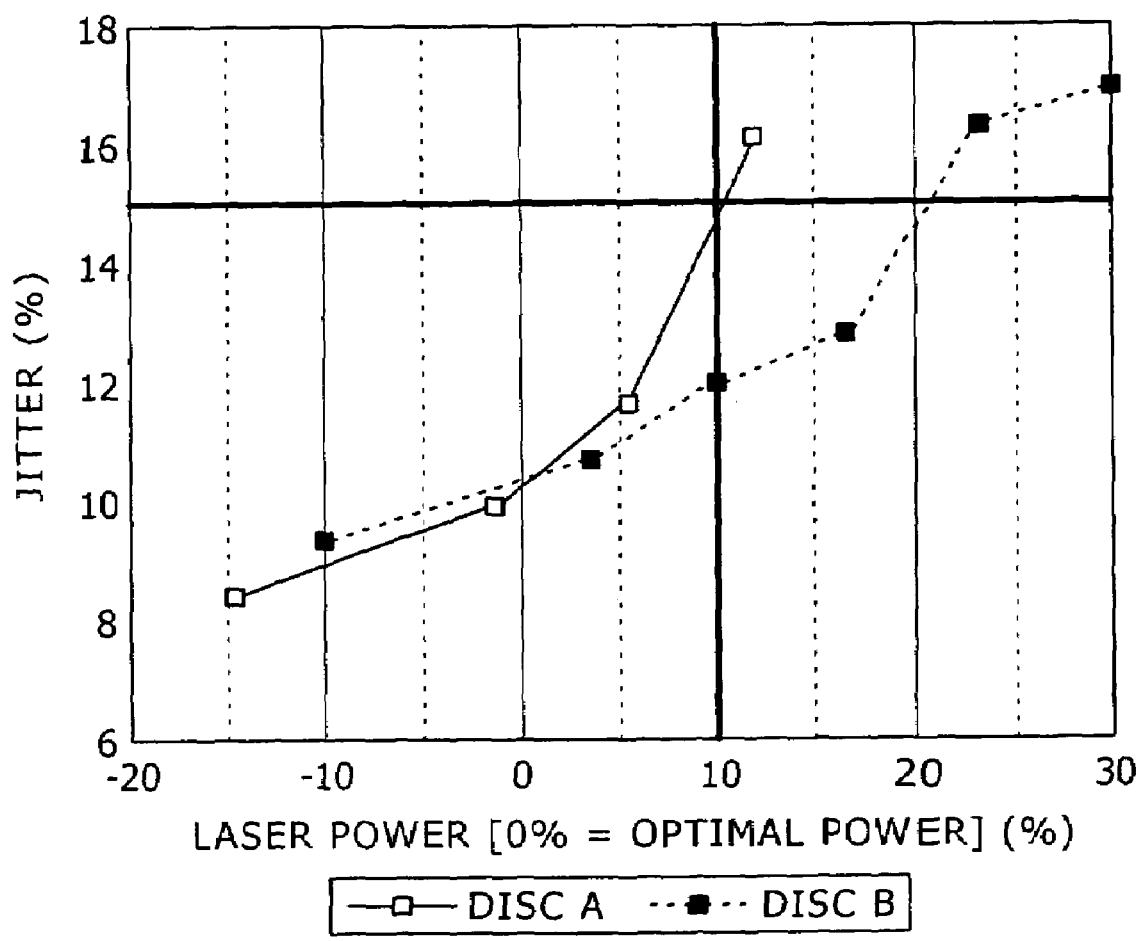
FIG. 4 is a graphical representation showing an example of measurement results of jitter values after overwrite is repetitively performed with different laser powers by utilizing the method of inspecting an optical recording medium according to the embodiment of the present invention.

FIG. 4 shows the results of measuring the jitter values of the regenerative signals after the overwrite was repetitively performed 1,000 times to the disc A and B with the different laser powers in the room temperature environment. In FIG. 4, an axis of abscissa represents a changed value of the laser power with respect to the optimal power, and an axis of ordinate represents the jitter value which was measured with the jitter measuring device 28. In the axis of abscissa, the laser power when the laser power is 0% is set as the optimal power.

As can be seen from FIG. 4, while in both the optical discs A and B, the jitter is degraded as the laser power increases, with the laser power which is 10% larger than the optimal power, the jitter in the optical disc B is about 12%, whereas the jitter in the optical disc A is about 15% as one reference of the acceptable quality. In addition, with the laser power which is 15% larger than the optimal power, the jitter of the optical disc A is further largely degraded to such a degree that it cannot be measured with the optical disc inspecting apparatus 1. It should be noted that while in this example, the number of times of the repetition of the overwrite is set to 1,000 times, the number of times of the repetition of the overwrite is not limited to this value as long as the difference in jitter between the optical discs can be recognized based thereon.

Figure 5:
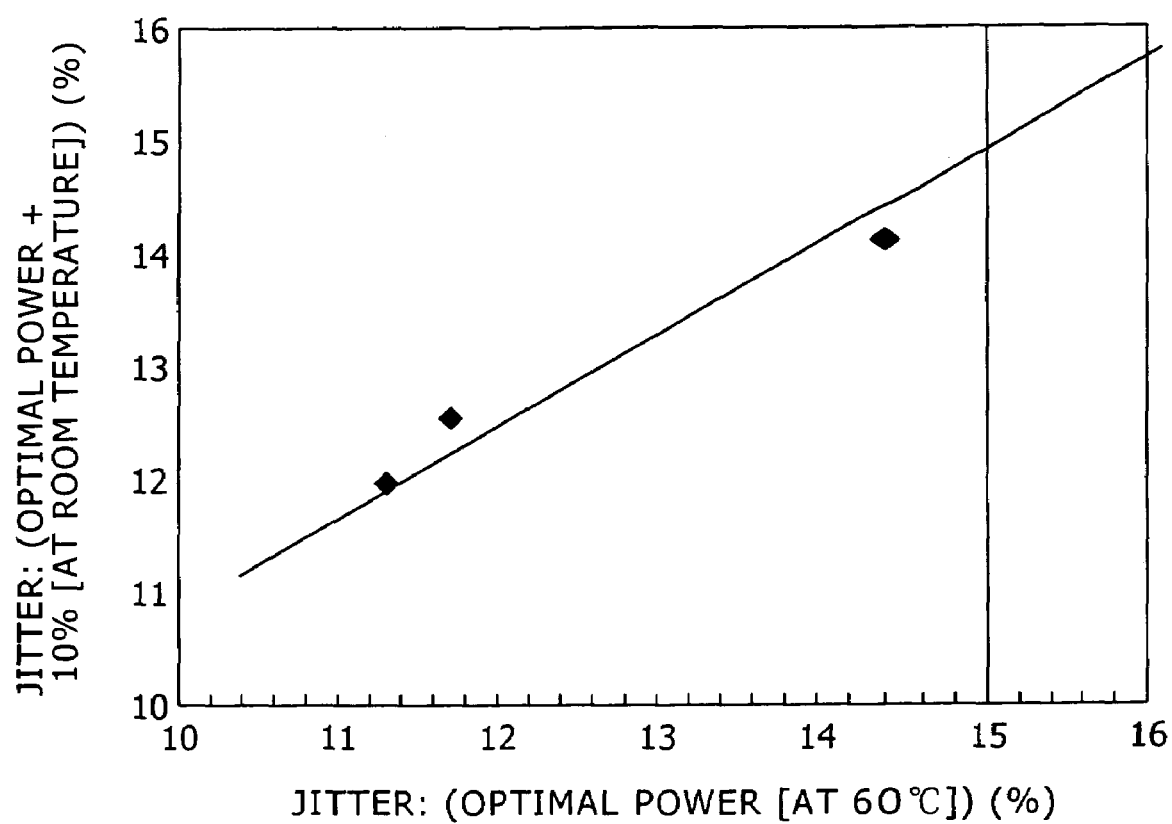
FIG. 5 is a graphical representation showing a correlation between measured values of a jitter after overwrite is repetitively performed at a high temperature and jitter values after overwrite is repetitively performed with a laser power which is 10% larger than an optimal power at a room temperature, the measured values and the jitter values being obtained by utilizing the method of inspecting an optical recording medium according to the embodiment of the present invention.

Next, FIG. 5 shows a correlation between the measured values of the jitter values after the overwrite is repetitively performed 1,000 times for several kinds of phase-change type optical discs with the optimal power in the high temperature environment (60° C.), and the jitter values of the regenerative signals after the overwrite is repetitively performed 1,000 times for the several kinds of phase-change type optical discs with the laser power 10% larger than the optical power in the room temperature environment. As can be seen from FIG. 5, a nearly linear correlation can be found out between both the measured values and the jitter values. In the case as well where the measurements were performed with the laser power which is a value of about 10% to about 15% larger than the optimal power, nearly the same results were obtained. It can be confirmed from this that the overwrite is repetitively performed with the laser power slightly larger than the optimal power at the room temperature, whereby it is possible to estimate the degradation of the characteristics of the optical disc due to the repetitive overwrite at the high temperature.

The range in which the laser power of the applied laser beam during the inspection in the room temperature environment is at least about 10% larger than the optimal power, and at most about 15% larger than the optimal power is judged to be suitable as the measurement conditions during the inspection according to the above-mentioned embodiment.

In addition, as shown in FIG. 5, when the jitter value of the regenerative signal after the repetitive overwrite in the high temperature environment is about 15%, the jitter value after the repetitive overwrite with the laser power 10% larger than the optical power in the room temperature is also about 15%. From this, as for one reference, the fact that the jitter value of the regenerative signal after the overwrite, for example, is repetitively performed 1,000 times at the room temperature is equal to or smaller than 15% is preferably decided as the criterion for the quality of the optical disc. For example, the jitter value of the regenerative signal is measured, the controller 13 judges whether or not the measured value is equal to or smaller than a reference value, for the jitter in the optical disc, stored in a non-volatile memory (not shown), and judges based on the judgment results whether or not the specification is fulfilled.

Incidentally, in the case where the correlation shown in FIG. 5 reveals that if the jitter value of the regenerative signal after the repetitive overwrite at the high temperature is about 15%, the jitter value after the overwrite is repetitively performed with the laser power 10% larger than the optimal power at the room temperature is about 13%, it can be judged that the jitter value which is equal to or smaller than 13% at the room temperature fulfills the reference value of 15% at the high temperature. In addition, while in this embodiment, the reference value of the jitter value at the high temperature is set to 15%, preferably, the reference value is suitably set depending on the specification of the medium.

According to the constitution described above, for the rewritable phase-change type optical disc, the degradation of the quality of the regenerative signal when the overwrite is repetitively performed in the high temperature environment can be estimated from the measurement at the room temperature. Consequently, the durability of the phase-change type optical disc at the high temperature can be accurately measured without imposing a burden on the optical disc inspecting apparatus, and whether or not the specification is fulfilled can be precisely and simply judged.

At that, it is to be understood that the present invention is not limited to the above-mentioned embodiment, and the various kinds of other constitutions may be adopted without departing from the gist of the present invention.

What is claimed is:

1. A method of inspecting a phase-change type optical recording medium, comprising the steps of:

performing repetitively overwrite to a same track with a laser power which is a given value higher than a laser power with which a jitter of a regenerative signal becomes minimum at a room temperature for a phase-change type optical recording medium in which a recording layer made of a material in which a phase change between a crystalline state and an amorphous state is caused due to a difference in applied laser power is provided;

measuring a jitter value of the regenerative signal after the overwrite is performed a given number of times; and judging whether or not the measured jitter value is equal to or smaller than a reference value.

2. A method of inspecting a phase-change type optical recording medium according to claim 1, wherein the overwrite is performed with the laser power which is a value of about 10% to about 15% larger than the laser power with which the jitter becomes minimum.

3. A method of inspecting a phase-change type optical recording medium according to claim 1, wherein the reference value for the jitter value after the overwrite is repetitively performed the given number of times is 15%.

4. A method of inspecting a phase-change type optical recording medium according to claim 1, wherein a ratio of an erase power level to a recording power level of the laser power during the overwrite is constant.

5. A method of inspecting a phase-change type optical recording medium according to claim 1, wherein the number of times of the overwrite is 1,000 times.

6. A method of inspecting a phase-change type optical recording medium according to claim 1, wherein said phase-change type optical recording medium is either a DVD-RW medium or a DVD+RW medium.

* * * * *